(12) United States Patent
Korenaga et al.

(10) Patent No.: US 11,421,995 B2
(45) Date of Patent: Aug. 23, 2022

(54) MAP MATCHING DEVICE, MAP MATCHING SYSTEM, MAP MATCHING METHOD AND PROGRAM

(71) Applicant: MITSUBISHI HEAVY INDUSTRIES MACHINERY SYSTEMS, LTD., Hyogo (JP)

(72) Inventors: Takeshi Korenaga, Tokyo (JP); Kenta Hara, Tokyo (JP)

(73) Assignee: MITSUBISHI HEAVY INDUSTRIES MACHINERY SYSTEMS, LTD., Hyogo (JP)

( * ) Notice: Subject to any disclaimer, the term of this patent is extended or adjusted under 35 U.S.C. 154(b) by 267 days.

(21) Appl. No.: 16/463,854

(22) PCT Filed: Nov. 29, 2016

(86) PCT No.: PCT/JP2016/085339
§ 371 (c)(1),
(2) Date: May 24, 2019

(87) PCT Pub. No.: WO2018/100617
PCT Pub. Date: Jun. 7, 2018

(65) Prior Publication Data
US 2019/0339084 A1 Nov. 7, 2019

(51) Int. Cl.
*G01C 21/32* (2006.01)
*G01C 21/34* (2006.01)

(52) U.S. Cl.
CPC ......... *G01C 21/32* (2013.01); *G01C 21/3446* (2013.01); *G01C 21/3453* (2013.01)

(58) Field of Classification Search
CPC ................ G01C 21/32; G01C 21/3446; G01C 21/3453; G01C 21/30; G01C 21/26;
(Continued)

(56) References Cited

U.S. PATENT DOCUMENTS

| | | | | |
|---|---|---|---|---|
| 10,444,763 | B2* | 10/2019 | Myers | B60R 16/0231 |
| 2010/0262359 | A1* | 10/2010 | Motoyama | G01C 21/32 701/532 |
| 2015/0168161 | A1* | 6/2015 | Raychev | G01C 21/32 701/430 |

FOREIGN PATENT DOCUMENTS

| | | | | |
|---|---|---|---|---|
| AU | 2009264278 A1 * | 12/2009 | | G01C 21/3682 |
| CN | 105674998 A * | 6/2016 | | |

(Continued)

OTHER PUBLICATIONS

International Search Report and Written Opinion for International Application No. PCT/JP2016/085339 dated Mar. 7, 2017; 10pp.

*Primary Examiner* — Khoi H Tran
*Assistant Examiner* — Nhi Q Bui
(74) *Attorney, Agent, or Firm* — Kaneska Berner and Partners LLP

(57) ABSTRACT

A map matching device includes: a candidate spot extraction unit that extracts candidate spots onto a link based on position measurement points; a movement cost determination unit that determines the movement cost of a combination of links connecting one of first candidate spots extracted based on one position measurement point to one of second candidate spots extracted based on another position measurement point, the movement cost determined separately for each combination of a first and a second candidate spot; a movement possibility judgment unit that judges, for each combination of first and second candidate spots, whether a moving body can move from the first to the second candidate spot, based on the movement cost; and a matching spot determination unit that determines, as the position of the moving body on the map, one of the candidate spots included in a combination for which movement was determined to be possible.

8 Claims, 11 Drawing Sheets

(58) Field of Classification Search
CPC .... G01C 21/34; G01C 21/367; G01C 21/005; G01C 21/3415; G01C 21/3492; G01C 21/3658; G01C 21/3682; G01C 21/3673; G01C 21/3815; G01C 21/362; G01C 21/3848; G01C 21/3811; G01C 21/3822; G08G 1/096838; G08G 1/096844; G08G 1/096883; G08G 1/096811; G08G 1/0129; G08G 1/0112; G08G 1/012; G08G 1/0969; G08G 1/096827; G08G 1/096775; G08G 1/166; G08G 1/0968; G08G 1/0104; G08G 1/0125; G08G 1/123; G06F 16/29; G06F 16/9535; G06F 16/24578; G06F 40/30
See application file for complete search history.

(56) References Cited

FOREIGN PATENT DOCUMENTS

| | | | | |
|---|---|---|---|---|
| CN | 108780156 A | * | 11/2018 | ............. G01C 21/28 |
| JP | H08292046 A | | 11/1996 | |
| JP | 2008039698 A | | 2/2008 | |
| JP | 2009064205 A | | 3/2009 | |
| JP | 2010267000 A | | 11/2010 | |
| JP | 2010267000 A | * | 11/2010 | |
| JP | 2011252767 A | | 12/2011 | |
| KR | 20140121780 A | * | 10/2014 | ........... G06T 7/0004 |
| WO | WO-2007119559 A1 | * | 10/2007 | ......... G01C 21/3617 |
| WO | 2009060776 A1 | | 5/2009 | |

* cited by examiner

FIG. 2

| NO. | APPARATUS ID | POSITION INFORMATION (LATITUDE, LONGITUDE) | MEASUREMENT DATE AND TIME (YEAR/MONTH/DAY, HOUR:MINUTE:SECOND) | SPEED (km/h) | MOVEMENT DIRECTION |
|---|---|---|---|---|---|
| P1 | 00000001 | N.**, E*.***** | t1 (YYYY/MM/DD, hh:mm:ss) |  | EAST |
| P2 | 00000001 | N.**, E*.***** | t2 (YYYY/MM/DD, hh:mm:ss) |  | SOUTH |
| P3 | 00000001 | N.**, E*.***** | t3 (YYYY/MM/DD, hh:mm:ss) |  | WEST |
| ... | ... | ... | ... | ... | ... |

SEGMENT n
SEGMENT 2
SEGMENT 1

| LINKAGE | A | B | C | D | E | F | G |
|---|---|---|---|---|---|---|---|
| A | 0 m | 35 m | 4 m | 20 m | 2 m | 28 m | 30 m |
| B | 15 m | 0 m | 19 m | 26 m | 13 m | 7 m | 13 m |
| C | 4 m | 39 m | 0 m | 24 m | 6 m | 32 m | 34 m |
| D | 30 m | 15 m | 34 m | 0 m | 28 m | 8 m | 10 m |
| E | 2 m | 37 m | 6 m | 22 m | 0 m | 30 m | 32 m |
| F | 22 m | 7 m | 26 m | 30 m | 20 m | 0 m | 20 m |
| G | 28 m | 13 m | 32 m | 10 m | 26 m | 18 m | 0 m |

FIG. 13

| CANDIDATE PATH | P2 | P3 | MOVEMENT COST (m) | MOVEMENT POSSIBILITY |
|---|---|---|---|---|
| R21 | x2 | x3a | 13.8 | POSSIBLE |
| R22 | x2 | x3b | 14.2 | POSSIBLE |
| CANDIDATE PATH | P3 | P4 | MOVEMENT COST (m) | MOVEMENT POSSIBILITY |
| R31 | x3a | x4a | 3.5 | POSSIBLE |
| R32 | x3a | x4b | 4 | POSSIBLE |
| R33 | x3b | x4a | 5.3 | POSSIBLE |
| R34 | x3b | x4b | 5.8 | IMPOSSIBLE |
| CANDIDATE PATH | P4 | P5 | MOVEMENT COST (m) | MOVEMENT POSSIBILITY |
| R41 | x4a | x5a | 38.5 | IMPOSSIBLE |
| R42 | x4a | x5b | 32.5 | POSSIBLE |
| R43 | x4b | x5a | 37 | IMPOSSIBLE |
| R44 | x4b | x5b | 31 | POSSIBLE |

FIG. 14

| P3 | | P4 | | P5 | |
|---|---|---|---|---|---|
| x3a | x3b | x4a | x4b | x5a | x5b |
| 0.1 | 0.4 | 0.3 | 0.2 | 0.6 | 0.4 |

MAP MATCHING DEVICE, MAP MATCHING SYSTEM, MAP MATCHING METHOD AND PROGRAM

RELATED APPLICATIONS

The present application is National Phase of International Application Number PCT/JP2016/085339 filed Nov. 29, 2016.

TECHNICAL FIELD

The present invention relates to a map matching device, a map matching system, a map matching method, and a program.

BACKGROUND ART

For example, an on-board unit mounted on a vehicle acquires a position measurement point (positioning point) of a moving object by using a global navigation satellite system (GLASS), various sensors, and the like, and determines a position of the position measurement point on a map configured with a plurality of connected links (roads). In this case, a position measurement point acquired in a case where a vehicle is located on a road may not match a position of the vehicle on a link corresponding to the road due to an error included in the position measurement point or an error between shapes (for example, a distance, a width, or an angle) of an actual road and a link.

Thus, an on-board unit of the related art acquires a position measurement point in a predetermined cycle (for example, per second), and performs a process called map matching for correcting a position measurement point such that a movement trajectory of a moving object obtained by connecting a plurality of position measurement points which continue in a time series to each other conforms to a shape of a link (for example, PTL 1). Consequently, the on-board unit can determine a position of a vehicle on a map by removing an error in a position measurement point and an error in a map.

CITATION LIST

Patent Literature

[PTL 1] International Publication No. WO2009/060776

SUMMARY OF INVENTION

Technical Problem

However, for example, in a system in which a server collects position measurement points from a plurality of on-board units via a network, and performs a map matching process, an interval of collecting position measurement points may be irregular according to a state of the network or an interval of collecting position measurement points may be set to be long in order to reduce a communication amount between the on-board unit and the server. In such a case, a vehicle may move through a plurality of links after the server acquires a certain position measurement point until acquiring the next position measurement point. Since the server cannot understand which link the vehicle moves through among a plurality of links connecting the certain position measurement point to the next position measurement point, in a case where even a link far away from the certain position measurement point, which the vehicle cannot reach, is judged as being a link closet to the next position measurement point, the server determines a position on the link as a position of the vehicle. As mentioned above, in the map matching process performed by the server, there is a case where a position of a vehicle on a map cannot be accurately determined.

The present invention provides a map matching device, a map matching system, a map matching method, and a program capable of determining a position of a moving object on a map even in a case where an interval of collecting position measurement points is long.

Solution to Problem

According to a first aspect of the present invention, there is provided a map matching device (20) which determines a position of a moving object on a map configured with a plurality of connected links on the basis of a position measurement point of the moving object. The map matching device includes a candidate location extraction unit (201) that extracts one or a plurality of candidate locations onto the link on the basis of the position measurement point; a movement cost determination unit (202) that determines a movement cost for the link connecting one of first candidate locations which are the candidate locations extracted on the basis of a certain position measurement point to one of second candidate locations which are candidate locations extracted on the basis of another position measurement point, for each combination of the first candidate locations and the second candidate locations; a movement possibility judgment unit (204) that judges whether or not the moving object is able to move from one of the first candidate locations to one of the second candidate locations for each combination of the first candidate locations and the second candidate locations on the basis of the movement cost; and a matching location determination unit (206) that determines any one of the candidate locations included in the combination for which movement is judged as being possible by the movement possibility judgment unit, as a position of the moving object on the map.

With this configuration, even in a case where a certain position measurement point and another position measurement point are far away from each other, and there are a plurality of combinations of links connecting the certain position measurement points to another position measurement point, the movement possibility judgment unit judges whether or not a moving object can move through each combination of links on the basis of a movement cost, and can thus determine only a candidate location for which movement is possible in reality as a position of the moving object on a map. Therefore, the map matching device can determine a position of a moving object on a map even in a case where an interval of collecting position measurement points.

According to a second aspect of the present invention, the movement cost determination unit determines a movement cost for each combination of the first candidate locations and the second candidate locations on the basis of a movement cost table in which the movement cost for the link connecting a certain linkage to another linkage is recorded in advance for each combination of the linkages.

With this configuration, since a movement cost between linkages is recorded in the movement cost table in advance, it is possible to reduce a process of the movement cost determination unit determining a movement cost. The movement cost determination unit can simplify (accelerate) a process of determining a movement cost for each candidate path on the basis of the movement cost table even in a case where there are a plurality of candidate paths.

According to a third aspect of the present invention, the map matching device further includes a movable distance estimation unit (203) that acquires a speed of the moving object at the position measurement point, and estimates a movable distance which the moving object is able to move between the time of measuring the certain position measurement point and the time of measuring another position measurement point on the basis of the speed. The movement possibility judgment unit judges that the moving object is able to move from one of the first candidate locations to one of the second candidate locations in a case where the movement cost is less than the movable distance.

With this configuration, the movement possibility judgment unit estimates a movable distance which the moving object can move between the time of measuring a certain position measurement point and the time of measuring another position measurement point, and thus it is possible to improve the accuracy of judgment of movement possibility in the movement possibility judgment unit.

According to a fourth aspect of the present invention, the map matching device further includes a score calculation unit (205) that calculates a score of each candidate location on the basis of a distance between the position measurement point and the candidate location related to the position measurement point. The matching location determination unit determines any one of the candidate locations included in a combination for which movement is judged as being possible by the movement possibility judgment unit, as the position of the moving object on the map on the basis of the score.

With this configuration, in a case where there are a plurality of combinations of candidate locations for which movement is judged as being possible, a position of a moving object on a map can be determined on the basis of scores of candidate locations included in the combinations.

According to a fifth aspect of the present invention, there is provided a map matching system including a client that measures a position of a moving object as a position measurement point; a position measurement point collecting section that collects the position measurement point measured by the client; and the map matching device according to any one of the aspects.

According to a sixth aspect of the present invention, there is provided a map matching method of determining a position of a moving object on a map configured with a plurality of connected links on the basis of a position measurement point of the moving object. The map matching method includes a candidate location extraction step of extracting one or a plurality of candidate locations onto the link on the basis of the position measurement point; a movement cost determination step of determining a movement cost for the link connecting one of first candidate locations which are the candidate locations extracted on the basis of a certain position measurement point to one of second candidate locations which are candidate locations extracted on the basis of another position measurement point, for each combination of the first candidate locations and the second candidate locations; a movement possibility judgment step of judging whether or not the moving object is able to move from one of the first candidate locations to one of the second candidate locations for each combination of the first candidate locations and the second candidate locations on the basis of the movement cost; and a matching location determination step of determining any one of the candidate locations included in the combination for which movement is judged as being possible in the movement possibility judgment step, as a position of the moving object on the map.

According to a seventh aspect, there is provided a program causing a computer of a map matching device which determines a position of a moving object on a map configured with a plurality of connected links on the basis of a position measurement point of the moving object, to function as a candidate location extraction unit that extracts one or a plurality of candidate locations onto the link on the basis of the position measurement point; a movement cost determination unit that determines a movement cost for the link connecting one of first candidate locations which are the candidate locations extracted on the basis of a certain position measurement point to one of second candidate locations which are candidate locations extracted on the basis of another position measurement point, for each combination of the first candidate locations and the second candidate locations; a movement possibility judgment unit that judges whether or not the moving object is able to move from one of the first candidate locations to one of the second candidate locations for each combination of the first candidate locations and the second candidate locations on the basis of the movement cost; and a matching location determination unit that determines any one of the candidate locations included in the combination for which movement is judged as being possible by the movement possibility judgment unit, as a position of the moving object on the map.

Advantageous Effects of Invention

According to the map matching device, the map matching system, the map matching method, and the program, it is possible to determine a position of a moving object on a map even in a case where an interval of collecting position measurement points is long.

BRIEF DESCRIPTION OF DRAWINGS

FIG. 2 is a diagram illustrating examples of position measurement points collected by a position measurement point collecting section according to the first embodiment of the present invention.

FIG. 13 is a diagram for explaining a process in a movement cost determination unit according to the second embodiment of the present invention.

FIG. 14 is a diagram for explaining a process in a score calculation unit according to the second embodiment of the present invention.

DESCRIPTION OF EMBODIMENTS

First Embodiment

Hereinafter, a map matching system 1 according to a first embodiment will be described with reference to FIGS. 1 to 10.

(Overall Configuration of Map Matching System)

First, the overall configuration of the map matching system will be described with reference to FIGS. 1 and 2.

Figure 1:
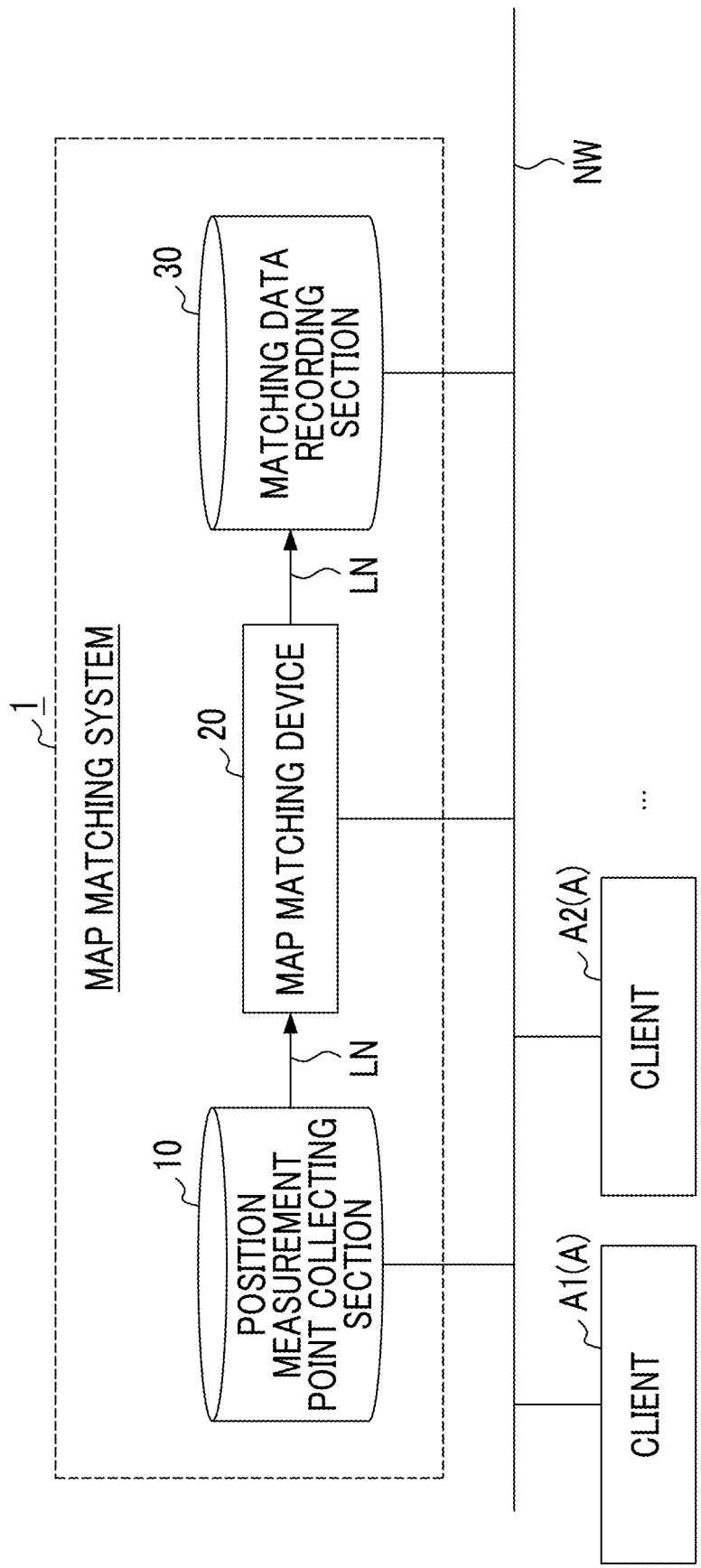
FIG. 1 is a diagram illustrating the overall configuration of a map matching system according to a first embodiment of the present invention.

FIG. 1 is a diagram illustrating the overall configuration of the map matching system according to the first embodiment of the present invention.

As illustrated in FIG. 1, the map matching system 1 includes a position measurement point collecting section 10, a map matching device 20, and a matching data recording section 30.

The position measurement point collecting section 10 is a server collecting a position measurement point indicating a position of a moving object such as a vehicle or a pedestrian. The position measurement point collecting section 10 collects position measurement points transmitted from a plurality of clients A (A1, A2, . . . ) such as an on-board unit mounted on a vehicle and a portable terminal carried by a pedestrian, via a network NW such as the Internet.

In the present embodiment, the client A records a position measurement point indicating a position whenever the position of a moving object having the client A is measured. The client A transmits a position measurement point measured when a predetermined time (for example, one minute) elapses and when a predetermined event (for example, starting and ending of the client A or starting and stopping of a moving object), to the position measurement point collecting section 10.

FIG. 2 is a diagram illustrating examples of position measurement points collected by the position measurement point collecting section according to the first embodiment of the present invention.

As illustrated in FIG. 2, the position measurement point collecting section 10 collects and accumulates position measurement points received from the plurality of clients A.

A position measurement point includes an apparatus ID for specifying the client A, position information (latitude and longitude) indicating a position of a moving object, the measurement date and time at which the position measurement point is measured, and a speed (km/h) and a movement direction (azimuth) of the moving object at the time of measuring the position measurement point. The position measurement point may include altitude in addition to latitude and longitude. The movement direction of the moving object may include an inclination in the gravitational direction, indicating that the moving object is traveling on a slope, in addition to an azimuth.

The map matching device 20 performs a map matching process on the basis of each of the position measurement points collected by the position measurement point collecting section 10, and thus determines a position (hereinafter, a matching location) of each of the clients A (moving objects having the clients A) on a map configured with a plurality of connected links (roads).

Details of a process of the map matching device 20 determining a matching location will be described later.

The matching data recording section 30 is a database on which a matching location of each moving object determined by the map matching device 20 is recorded in association with a position measurement point.

In the present embodiment, the position measurement point collecting section 10, the map matching device 20, and the matching data recording section 30 are connected to each other via the network NW. The position measurement point collecting section 10, the map matching device 20, and the matching data recording section 30 may be connected to each other via a network LN such as a local area network (LAN).

(Functional Configuration of Map Matching Device)

Next, a description will be made of a functional configuration of the map matching device 20 with reference to FIG. 3.

Figure 3:
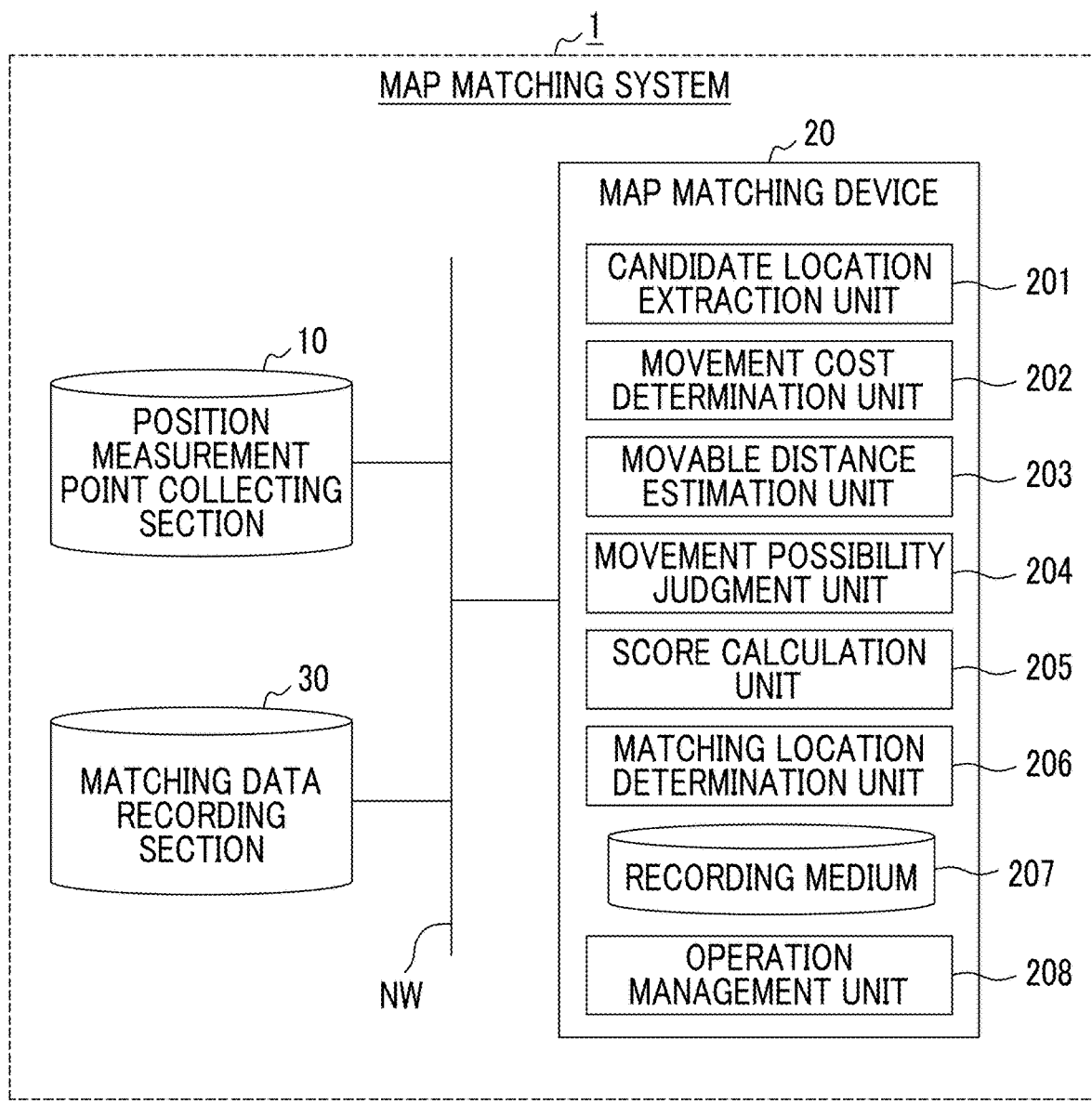
FIG. 3 is a diagram illustrating a functional configuration of a map matching device according to the first embodiment of the present invention.

FIG. 3 is a diagram illustrating a functional configuration of the map matching device according to the first embodiment of the present invention.

As illustrated in FIG. 3, the map matching device 20 includes a candidate location extraction unit 201, a movement cost determination unit 202, a movable distance estimation unit 203, a movement possibility judgment unit 204, a score calculation unit 205, a matching location determination unit 206, a recording medium 207, and an operation management unit 208.

The candidate location extraction unit 201 extracts one or a plurality of candidate locations onto a link on the basis of position measurement points collected by the position measurement point collecting section 10.

Specifically, the candidate location extraction unit 201 selects one or a plurality of links located within a predetermined distance (for example, 10 m) from a position measurement point on the basis of a map (FIG. 5), recorded in advance on the recording medium 207, configured with a plurality of links and a linkage connecting the links to each other, and position information of the position measurement point. Details of the map will be described later.

The candidate location extraction unit 201 extracts a position which is located on the selected link and is closest from the position measurement point, as a candidate location. In a case where a plurality of links are selected, the candidate location extraction unit 201 extracts a candidate location for each link.

The movement cost determination unit 202 determines a movement cost for each combination of a link connecting a candidate location (first candidate location) extracted on the basis of a certain position measurement point to a candidate location (second candidate location) extracted on the basis of another position measurement point. In the present embodiment, the movement cost indicates a sum of lengths (distances) of one or a plurality of links connecting a certain linkage to other linkages, for each combination of linkages.

In the present embodiment, a movement cost table (FIG. 6) in which a movement cost is set in advance for each combination of links is recorded on the recording medium 207. Details of the movement cost table will be described later. The movement cost determination unit 202 determines a movement cost for each combination of links by referring to the movement cost table recorded on the recording medium 207.

In the following description, combinations of links connecting the first candidate location to the second candidate location will also be referred to as candidate paths.

The movable distance estimation unit 203 estimates a movable distance which a moving object can move between the time of measuring a certain position measurement point and the time of measuring another position measurement point on the basis of a speed of the moving object at the time (measurement date and time) of measuring the certain position measurement point and a speed of the moving object at the time (measurement date and time) of measuring another position measurement point.

The movement possibility judgment unit 204 judges whether or not the moving object can move through each candidate path on the basis of the movement cost for each combination (candidate path) of links determined by the movement cost determination unit 202.

Specifically, the movement possibility judgment unit 204 compares the movable distance of the moving object estimated by the movable distance estimation unit 203 with a movement cost for each candidate path. In a case where the movement cost for the candidate path is less than the movable distance, the movement possibility judgment unit 204 judges that the object can move through the candidate path. On the other hand, in a case where the movement cost for the candidate path is equal to or more than the movable distance, the movement possibility judgment unit 204 judges that the object cannot move through the candidate path.

The score calculation unit 205 calculates a score of each candidate location on the basis of a distance between a position measurement point and a candidate location related to the position measurement point.

In the present embodiment, a value obtained by multiplying the distance between the position measurement point and the candidate location by a predetermined coefficient is used as a score of the candidate location. As the distance between the position measurement point and the candidate location becomes shorter, a value of a score becomes smaller.

The matching location determination unit 206 determines, as a matching location, a candidate location for which a value of a score is smallest among candidate locations included in a combination (candidate path) of links through which the moving object is judged as being capable of moving by the movement possibility judgment unit 204.

The matching location determination unit 206 records matching data in which the determined matching location is associated with the position measurement point, on the matching data recording section 30.

A map (FIG. 5) and a movement cost table (FIG. 6) for each segment are recorded on the recording medium 207 in advance.

The operation management unit 208 manages an operation of the client A (or a moving object having the client A) specified on the basis of an apparatus ID by using the matching data recorded on the matching data recording section 30.

For example, it is assumed that an on-board unit is mounted on a truck or the like of a forwarding agent, and the on-board unit is the client A specified on the basis of an apparatus ID. The operation management unit 208 performs driving analysis such as a movement route, a movement distance, and a movement time of the client A (or the truck mounted with the client A) specified on the basis of an apparatus ID by using matching data correlated with the apparatus ID. The operation management unit 208 may judge whether or not a matching location correlated with a certain apparatus ID is separated by a predetermined distance (for example, 5 km) from a movement route, a destination, a relay station, or the like, designated for each apparatus ID (for each truck) on the basis of matching data. In this case, in a case where it is judged that a matching location correlated with the apparatus ID is separated from a movement route or the like by a predetermined distance or more, the operation management unit 208 may display alert information indicating that the matching location is deviated from the movement route on a display unit (not illustrated) of the map matching device, and may transmit a command for outputting alert information to the client A via the network NW. The operation management unit 208 may generate a new movement route to a destination, a relay station, or the like from the latest (latest measurement date and time) matching location of the client A, and may cause the new movement route to be included in alert information.

(Process Flow in Map Matching Device)

Hereinafter, a description will be made of a process flow in the map matching device 20 with reference to FIGS. 4 to 9.

Figure 4:
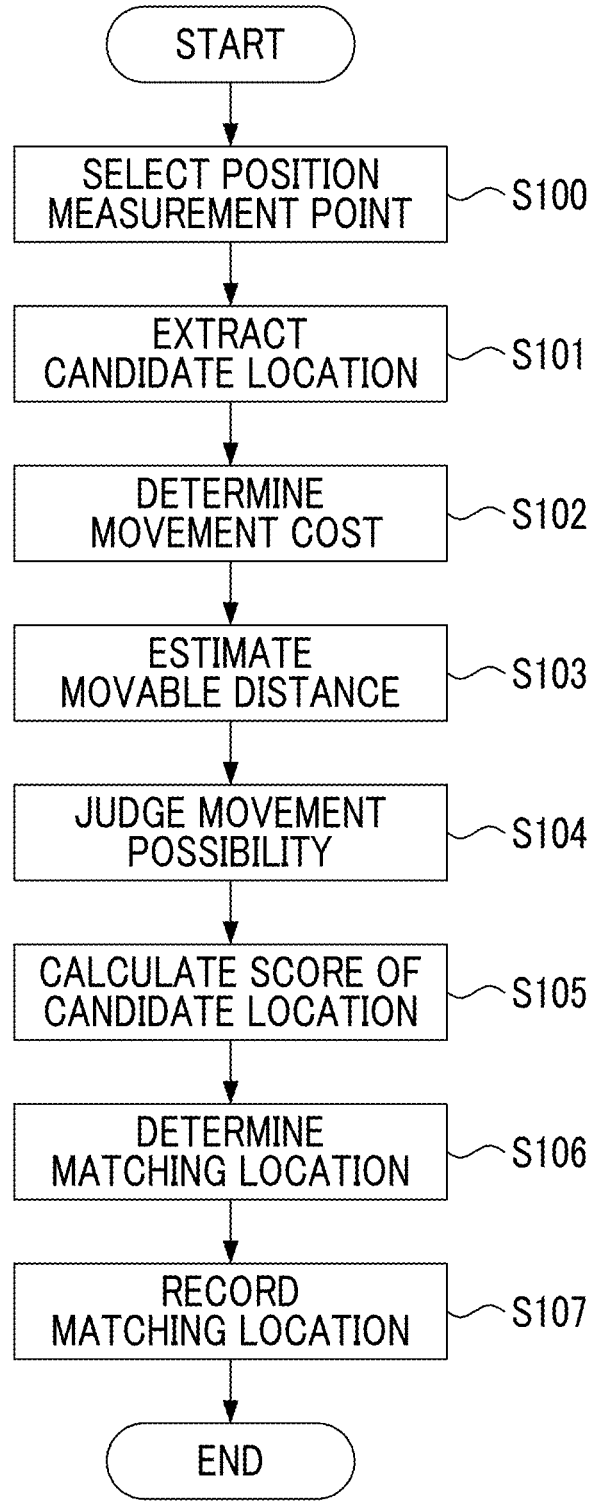
FIG. 4 is a diagram illustrating a process flow in the map matching device according to the first embodiment of the present invention.

FIG. 4 is a diagram illustrating a process flow in the map matching device according to the first embodiment of the present invention.

As illustrated in FIG. 4, first, the candidate location extraction unit 201 of the map matching device 20 selects a position measurement point which is a map matching process target from the position measurement point collecting section 10 (step S100).

In the present embodiment, the candidate location extraction unit 201 selects a position measurement point Pi of which the measurement date and time is old as a map matching process target from among a plurality of position measurement points having a certain apparatus ID. It is assumed that a matching location is specified through a map matching process performed in the past with respect to a position measurement point (for example, the previous position measurement point Pi−1 of the position measurement point Pi) having the older measurement date and time than that of the position measurement point Pi, and is recorded on the matching data recording section 30.

In the following example, a description will be made of a case where the candidate location extraction unit 201 selects the position measurement point P2 having the apparatus ID "00000001" as the position measurement point Pi which is a map matching process target from among the position measurement points illustrated in FIG. 2. It is assumed that, with respect to the position measurement point Pi−1 which is the previous position measurement point of the position measurement point P2 and has the same apparatus ID as that of the position measurement point P2, that is, the position measurement point P1, a candidate location x1 is determined as a matching location through a map matching process performed in the past.

Next, the candidate location extraction unit 201 extracts candidate locations of the position measurement point Pi (position measurement point P2) selected in step S100 (step S101).

Figures 5, 6:
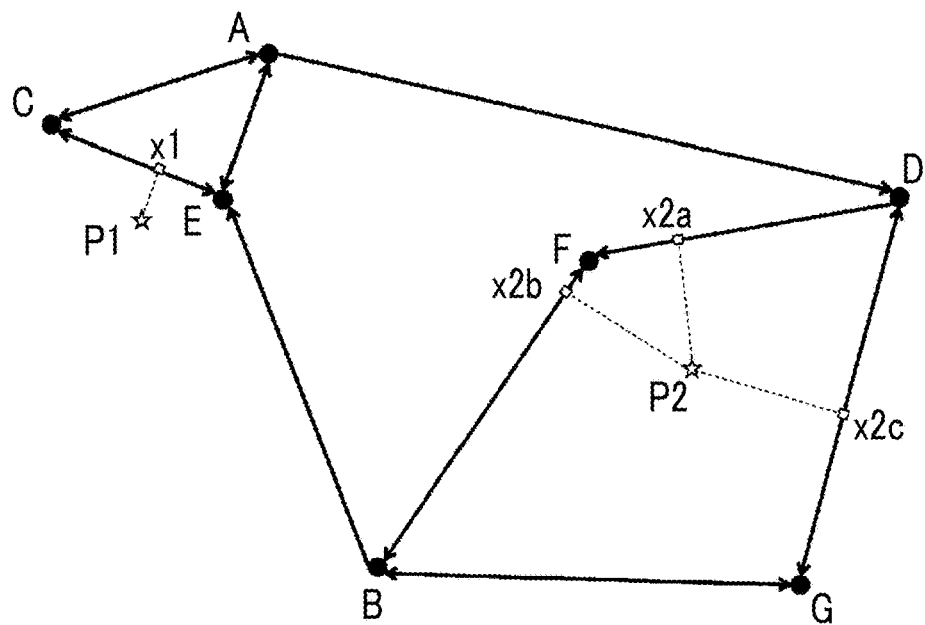
FIG. 5 is a diagram for explaining a function of the map matching device according to the first embodiment of the present invention.
FIG. 6 is a diagram illustrating an example of a movement cost table according to the first embodiment of the present invention.

FIG. 5 is a diagram for explaining a function of the map matching device according to the first embodiment of the present invention.

In the present embodiment, as illustrated in FIG. 5, a map configured with a plurality of links and linkages connecting the links to each other is recorded on the recording medium 207 in advance. Information indicating a length (distance) of a link and attribute information of each link are recorded in the map. The attribute information of a link includes, for example, information indicating one-way traffic and a passable direction, information indicating an expressway or a pedestrian walkway, and information indicating a speed limit of the link.

In a case where candidate locations of the position measurement point P2 are extracted, first, the candidate location extraction unit 201 selects three links such as a link D-F, a link B-F, and a link D-G as links located within a predetermined distance (for example, 10 m) from the position measurement point P2.

The candidate location extraction unit 201 extracts positions which are present on the selected links and are closest to the position measurement point P2, as candidate locations. Specifically, as illustrated in FIG. 5, the candidate location extraction unit 201 extracts "x2a" as a candidate location on the link D-F, extracts "x2b" as a candidate location on the link B-F, and extracts "x2c" as a candidate location on the link D-G.

Next, the movement cost determination unit 202 reads candidate locations of the previous position measurement point Pi-1 from the matching data recording section 30. The movement cost determination unit 202 determines movement costs for links connecting the candidate locations extracted on the basis of the position measurement point Pi to the candidate locations of the previous position measurement point Pi-1 for each combination (candidate path) of the candidate locations (step S102).

Specifically, first, the movement cost determination unit 202 reads the candidate location x1 of the previous position measurement point P1 from the matching data recording section 30. The movement cost determination unit 202 determines a movement cost for a candidate path R1 connecting the candidate location x2a of the position measurement point P2 to the candidate location x1 of the position measurement point P1, a movement cost for a candidate path R2 connecting the candidate location x2b of the position measurement point P2 to the candidate location x1 of the position measurement point P1, and a movement cost for a candidate path R3 connecting the candidate location x2c of the position measurement point P2 to the candidate location x1 of the position measurement point P1.

In the present embodiment, the movement cost determination unit 202 determines a movement cost for each candidate path on the basis of a movement cost table (FIG. 6) stored in advance in the recording medium 207.

FIG. 6 is a diagram illustrating an example of a movement cost table according to the first embodiment of the present invention.

In the present embodiment, a movement cost table on which a movement cost (minimum movement cost) in movement from a certain linkage to another linkage is recorded is created in advance for each segment, and is stored in the recording medium 207.

The segment is to divide a map for each range of a predetermined distance (for example, 1 km) from a certain linkage (start point linkage). For example, as illustrated in FIG. 6, in a segment 1, the linkages A to G located within a predetermined distance range from the start point linkage A are included, and a movement cost in movement from each linkage to another linkage in the segment 1 is recorded. In a case where movement costs for combinations of all linkages on a map are covered, a capacity of the movement cost table becomes large. However, in the present embodiment, the movement cost table is created for each segment, and thus it is possible to reduce a capacity of the movement cost table.

The minimum movement cost indicates a movement cost for a path having the smallest value (shortest distance) among movement costs for respective paths in a case where there are a plurality of combinations (paths) of passing links in movement from a certain linkage to another linkage. In the example illustrated in FIG. 5, in a case where there are a plurality of paths from the linkage A to the linkage F, but a movement cost for a path passing through the link A-D and the link D-F is smallest, the movement cost for the path is recorded in the movement cost table as the minimum movement cost.

Figure 7:
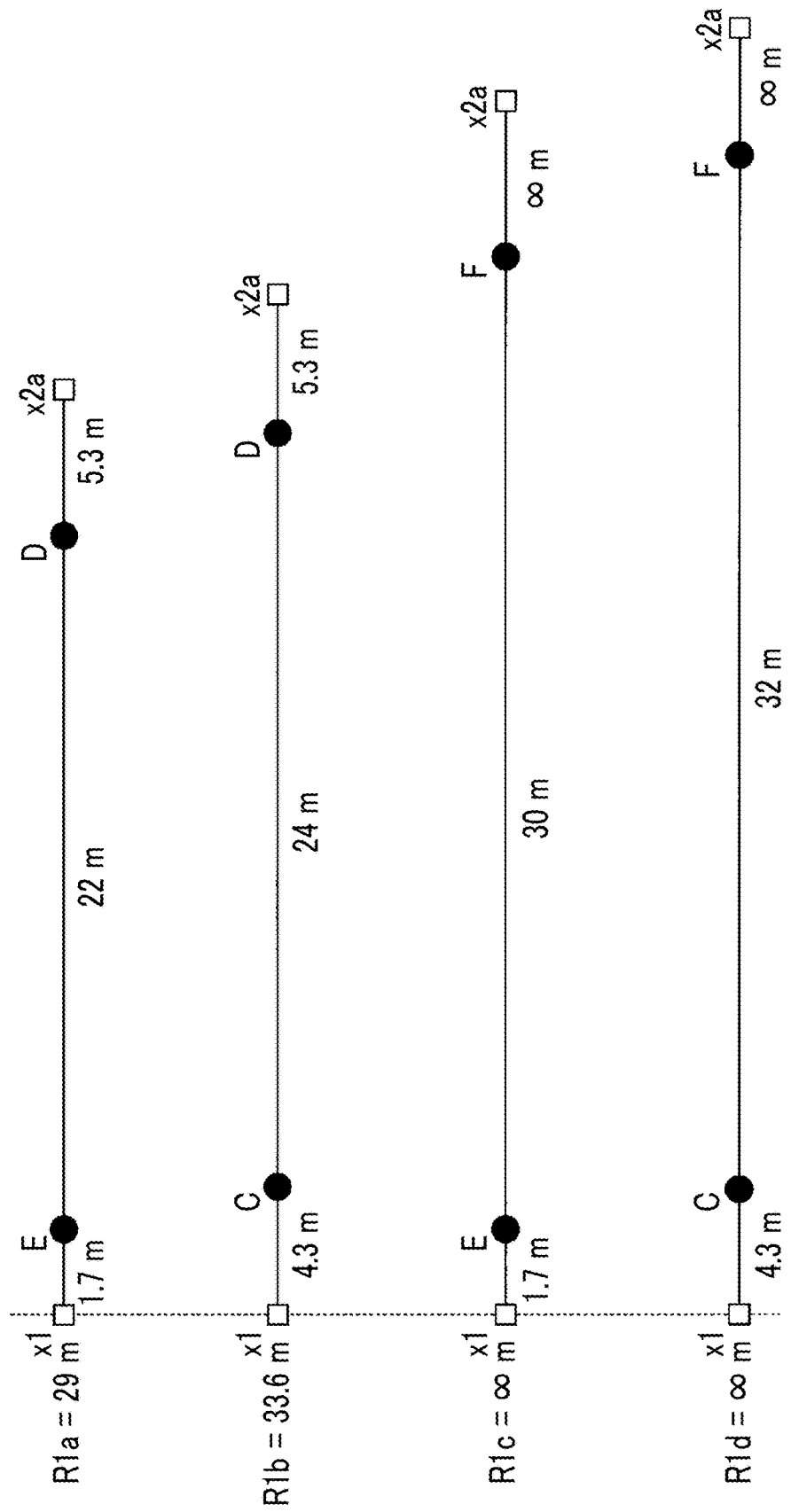
FIG. 7 is a diagram for explaining a process in a movement cost determination unit according to the first embodiment of the present invention.

FIG. 7 is a diagram for explaining a process in the movement cost determination unit according to the first embodiment of the present invention.

With reference to FIGS. 4 and 7, a description will be made of details of a process of the movement cost determination unit 202 determining a movement cost for each candidate path.

For example, it is assumed that, as the candidate path R1 connecting the candidate location x1 of the position measurement point P1 to the candidate location x2a of the position measurement point P2, as illustrated in FIG. 7, there are four paths such as a path R1a (the candidate location x1 to the linkage E, the link E-D, and the linkage D to the candidate location x2a), a path R1b (the candidate location x1 to the linkage C, the link C-D, and the linkage D to the candidate location x2a), a path R1c (the candidate location x1 to the linkage E, the link E-F, and the linkage D to the candidate location x2a), and a path R1d (the candidate location x1 to the linkage C, the link C-F, and the linkage F to the candidate location x2a).

The movement cost determination unit 202 calculates movement costs for the respective paths R1a to R1d. For example, in a case where a movement cost for the path R1a is calculated, the movement cost determination unit 202 calculates a movement cost (distance) from the candidate location x1 to the linkage E and a movement cost (distance) from the linkage D to the candidate location x2a on the basis of the map, and acquires a movement cost for the link E-D from the movement cost table. The movement cost determination unit 202 adds together the movement cost (1.7 m) from the candidate location x1 to the linkage E, the movement cost (22 m) for the link E-D, and the movement cost (5.3 m) from the linkage D to the candidate location x2a, so as to obtain the movement cost (29 m) for the path R1a.

The movement cost determination unit 202 obtains movement costs for the paths R1b to R1d in the same manner. As illustrated in FIG. 5, in a case where information indicating one-way traffic in which only traffic from the linkage D to the linkage F is permitted is included as attribute information of the link D-F, the movement cost determination unit 202 judges that movement from the linkage F to the candidate location x2a reverses the one-way traffic and thus is not possible. Thus, the movement cost determination unit 202 sets a movement cost from the linkage F to the candidate location x2a to "∞ m". As a result, movement costs for the path R1c and the path R1d including movement from the linkage F to the candidate location x2a is "∞ m".

The movement cost determination unit 202 determines a movement cost having the smallest value (shortest distance) among the movement costs for the paths R1a to R1d calculated as mentioned above, as a movement cost for the candidate path R1 from the candidate location x1 to the candidate location x2a. In the example illustrated in FIG. 7, since the movement cost (29 m) for the path R1a has the smallest value, the movement cost determination unit 202 determines a movement cost for the candidate path R1 from the candidate location x1 to the candidate location x2a as "29 m".

The movement cost determination unit 202 repeatedly performs the above-described process, so as to determine movement costs for the respective candidate paths R1 to R3.

Next, the movable distance estimation unit 203 estimates a movable distance which the moving object (the moving object mounted with the client A specified by the apparatus ID) can move between the measurement date and time t1 (hereinafter, referred to as a time t1) for the position measurement point P1 and the measurement date and time t2 (hereinafter, referred to as a time t2) for the position measurement point P2 on the basis of a speed of the moving object at the time (the measurement date and time for the position measurement point P2) of measuring the position measurement point P1 and a speed of the moving object at the time (the measurement date and time for the position measurement point P1) of measuring the previous position measurement point Pi−1 (step S103).

Figure 8:
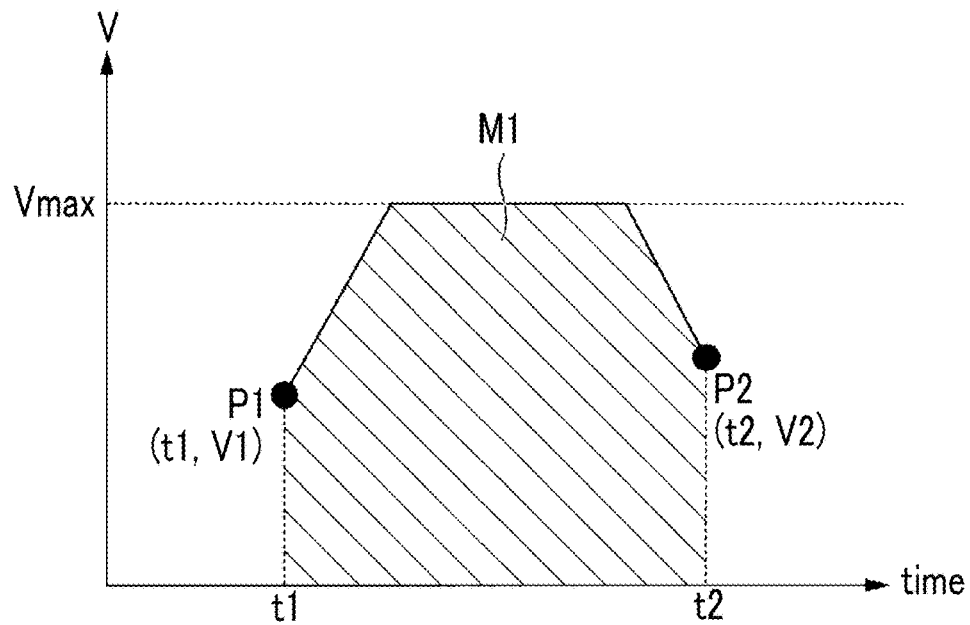
FIG. 8 is a first diagram for explaining a process in a movable distance estimation unit according to the first embodiment of the present invention.

FIG. 8 is a first diagram for explaining a process in the movable distance estimation unit according to the first embodiment of the present invention.

As illustrated in FIG. 8, it is assumed that the moving object is traveling at a speed V1 at the time t1, and is traveling at a speed V2 at the time t2. In this case, the movable distance estimation unit 203 assumes that the moving object is accelerated from the speed V1 to the highest speed Vmax of the moving object, continuously travels at the highest speed Vmax, and is decelerated to the speed V2, and estimates a movable distance (maximum movable distance) which the moving object can move from the time t1 to the time t2.

In the present embodiment, the highest speed Vmax, acceleration performance, and deceleration performance are set in advance for each type of moving object (a vehicle, a pedestrian, or the like). The movable distance estimation unit 203 specifies the type of moving object on the basis of the apparatus ID.

In the example illustrated in FIG. 8, the movable distance estimation unit 203 assumes a change (an inclination of acceleration) of the speed V of the moving object which starts to be accelerated from the speed V1 at the time t1 until reaching the highest speed Vmax, on the basis of the acceleration performance of the moving object. The movable distance estimation unit 203 assumes a change (an inclination of deceleration) of the speed V of the moving object which reaches the speed V2 from the highest speed Vmax up to the time t2, on the basis of the deceleration performance of the moving object. The movable distance estimation unit 203 estimates a movable distance which the moving object can move on the basis of the changes of the speed of the moving object from the time t1 to the time t2, assumed as mentioned above. As illustrated in FIG. 8, an area M1 inside the inclination of the acceleration, the highest speed Vmax, and the inclination of the deceleration indicates a movable distance of the moving object.

Figure 9:
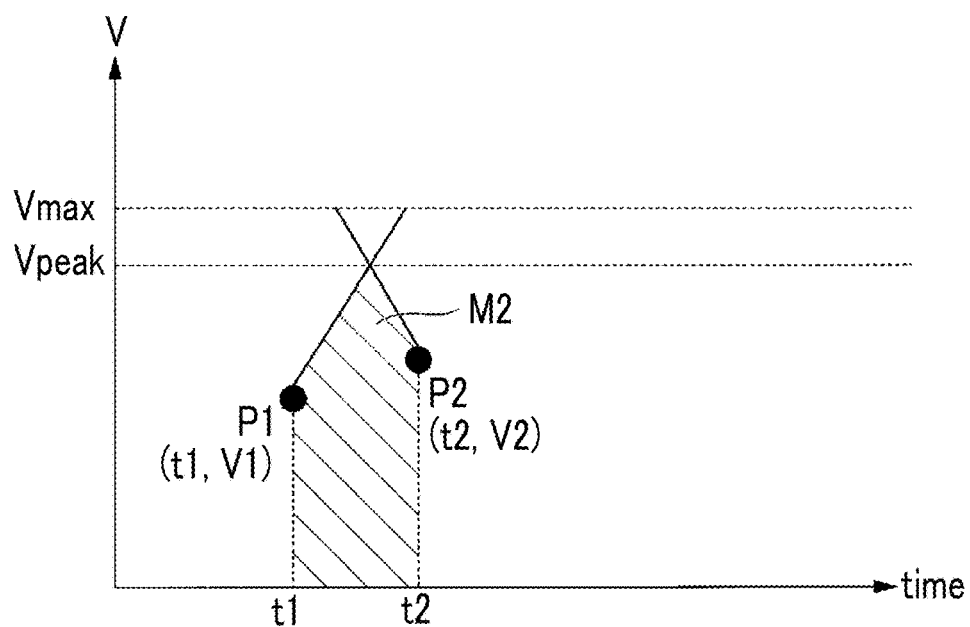
FIG. 9 is a second diagram for explaining a process in the movable distance estimation unit according to the first embodiment of the present invention.

FIG. 9 is a second diagram for explaining a process in the movable distance estimation unit according to the first embodiment of the present invention.

There is a case where a moving object does not reach the highest speed Vmax between the time t1 and the time t2, such as a case where a period from the measurement date and time t1 for the position measurement point P1 to the measurement date and time t2 for the position measurement point P2 is short. In this case, the movable distance estimation unit 203 assumes a peak speed Vpeak at which an inclination of acceleration based on acceleration performance of the moving object intersects an inclination of deceleration based on deceleration performance of the moving object, to be a peak speed of the moving object between the time t1 and the time t2. In other words, the movable distance estimation unit 203 assumes that the moving object starts to be accelerated from the speed V1 at the time t1, and is continuously accelerated until reaching the peak speed Vpeak. The movable distance estimation unit 203 assumes that the moving object starts to be decelerated from the time of reaching the peak speed Vpeak, and reaches the speed V2 at the time t2. The movable distance estimation unit 203 estimates a movable distance which the moving object can move on the basis of the changes of the speed of the moving object from the time t1 to the time t2, assumed as mentioned above. As illustrated in FIG. 9, an area M2 inside the inclination of the acceleration and the inclination of the deceleration indicates a movable distance of the moving object.

Next, the movement possibility judgment unit 204 judges whether or not the moving object can move through each candidate path on the basis of the movement cost for each candidate path (the candidate paths R1 to R3) determined by the movement cost determination unit 202 and the movable distance of the moving object estimated by the movable distance estimation unit 203 (step S104).

The movement cost in the present embodiment does not indicate a movement cost for a path through which the moving object actually moves, but indicates a movement cost for a path having the smallest movement cost (shortest distance) among a plurality of paths supposed for each candidate path. The movable distance in the present embodiment does not indicate a distance which the moving object actually moves, but indicates the maximum movement distance in a case where the moving object moves at the highest speed of speeds estimated on the basis of speeds of the moving object at the position measurement point Pi−1 and the position measurement point Pi from the measurement date and time ti−1 for the position measurement point Pi−1 and the measurement date and time ti for the position measurement point Pi. In other words, the movement possibility judgment unit 204 of the present embodiment judges whether or not the moving object can move through a candidate path in a case of assuming that the moving object moves through the shortest path at the maximum speed between the position measurement point Pi and the position measurement point Pi−1.

In the above example, in a case where a movement cost (for example, "29 m") for the candidate path R1 and a movement cost (for example, "35 m") for the candidate path R3 are smaller than a movable distance (for example, "37 m"), the movement possibility judgment unit 204 judges that the moving object can move through the candidate path R1 and the candidate path R3. On the other hand, in a case where a movement cost (for example, "39 m") for the candidate path R2 is larger than a movable distance, the movement possibility judgment unit 204 judges that the moving object cannot move through the candidate path R2.

Next, the score calculation unit 205 calculates a score of each candidate location on the basis of distances between the position measurement point P2 and the candidate locations x2a to x2c of the position measurement point P2 (step S105).

The score calculation unit 205 may calculate only a score of a candidate location included in a candidate path through which the moving object is judged as being capable of moving.

The score calculation unit 205 may change a score on the basis of a movement direction at the time of measuring a position measurement point and a direction in which a link on which a candidate location of the position measurement point is present. For example, in a case where a movement direction at the time of measuring the position measurement point P2 is "south" (FIG. 2), the score calculation unit 205 may multiply a coefficient for increasing a score since the movement direction (south) at the position measurement point P2 does not match a direction (east-west) in which the link D-F on which the candidate location x2a is present extends. On the other hand, since the movement direction (south) at the position measurement point P2 matches a direction (south-north) in which the link D-G on which the candidate location x2c is present extends, the score calculation unit 205 may multiply a coefficient not for changing a score or a coefficient for decreasing a score.

Next, the matching location determination unit 206 determines, as a matching location, a candidate location having the smallest value of a score among candidate locations included in a candidate path through which the moving object is judged as being capable of moving by the movement possibility judgment unit 204 (step S106).

For example, a score of the candidate location x2a included in the candidate path R1 through which the moving object is judged as being capable of moving by the movement possibility judgment unit 204 is compared with a score of the candidate location x2c included in the candidate path R3.

For example, it is assumed that a score calculated on the basis of a distance between the position measurement point P2 and the candidate location x2a is "0.3", and a score calculated on the basis of a distance between the position measurement point P2 and the candidate location x2c is "0.5". In this case, since the score of the candidate location x2a is smaller than the score of the candidate location x2c, and thus the matching location determination unit 206 determines the candidate location x2a as a matching location for the position measurement point P2.

Next, the matching location determination unit 206 records the determined matching location (candidate location x2a) on the matching data recording section 30 in association with the position measurement point P2 (step S107).

In a case where the map matching process for the position measurement point Pi (position measurement point P2) is completed, the map matching device 20 returns step S100, and repeatedly performs the map matching process on the next position measurement point Pi+1 (position measurement point P3).

(Hardware Configuration of Map Matching Device)

Figure 10:
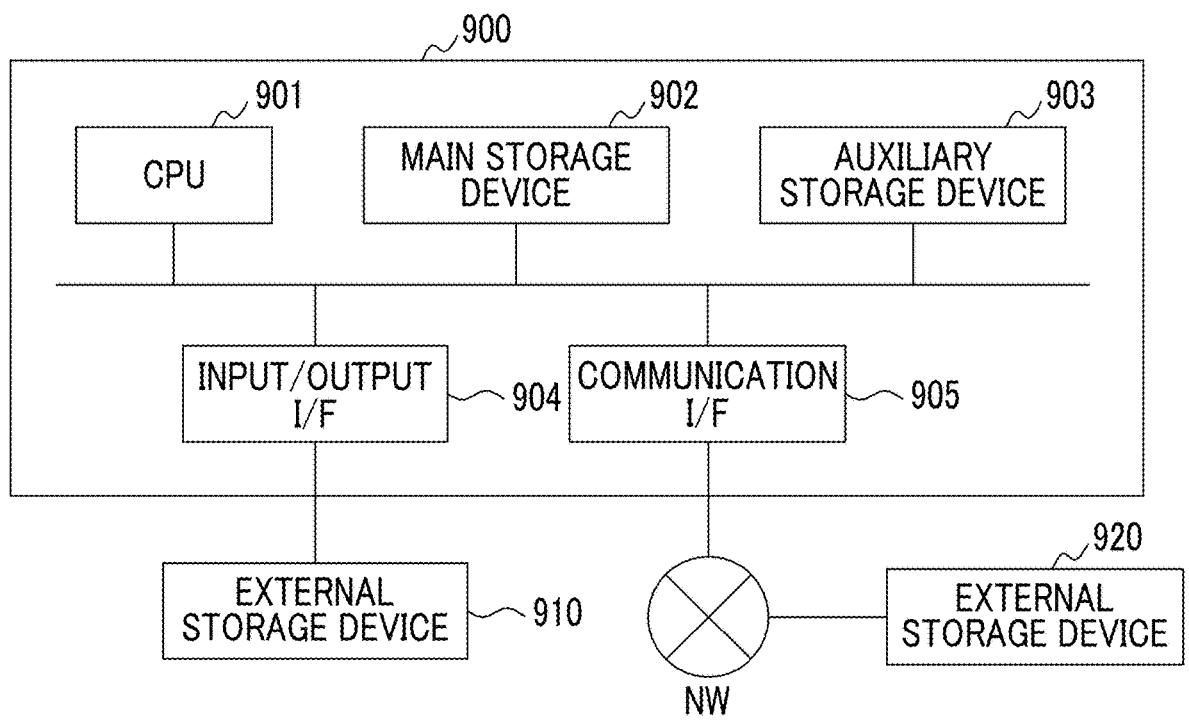
FIG. 10 is a diagram illustrating a hardware configuration example of the map matching device according to the first embodiment of the present invention.

FIG. 10 is a diagram illustrating a hardware configuration example of the map matching device according to the first embodiment of the present invention.

Hereinafter, a description will be made of a hardware configuration example of the map matching device 20 of the present embodiment with reference to FIG. 10.

A computer 900 includes a CPU 901, a main storage device 902, an auxiliary storage device 903, an input/output interface 904, and a communication interface 905.

The map matching device 20 is mounted in the computer 900. The operation of each processing unit is stored in the auxiliary storage device 903 in the form of a program. The CPU 901 reads the program from the auxiliary storage device 903, develops the program on the main storage device 902, and performs the process according to the program. The CPU 901 secures a storage region corresponding to the recording medium 207 in the main storage device 902 according to the program. The CPU 901 secures a storage region storing data which is being processed in the auxiliary storage device 903 according to the program. The computer 900 is connected to an external storage device 910 via the input/output interface 904, and a storage region corresponding to the recording medium 207 may be secured in the external storage device 910. The computer 900 is connected to an external storage device 920 via the communication interface 905, and a storage region corresponding to the recording medium 207 may be secured in the external storage device 920.

In at least one embodiment, the auxiliary storage device 903 is an example of a non-transitory medium. Other examples of the non-transitory medium may include a magnetic disk, a magnetooptical disc, a CD-ROM, a DVD-ROM, and a semiconductor memory, connected via the input/output interface 904. In a case where the program is delivered to the computer 900 via a communication line, the computer 900 may develop the delivered program on the main storage device 902, and may perform the process.

The program may realize some of the functions. The program may be a so-called difference file (difference program) realizing the functions in combination with another program which is already stored in the auxiliary storage device 903.

The map matching device 20 may be configured with a single computer 900, and may be configured with a plurality of computers which are communicably connected to each other.

(Advantageous Effects)

As mentioned above, the map matching device 20 according to the present embodiment includes the candidate location extraction unit 201 which extracts one or a plurality of candidate locations onto a link on the basis of a position measurement point, the movement cost determination unit 202 which determines movement costs for links (candidate paths R1 to R3) connecting one of the candidate locations x2a to x2c (first candidate locations) extracted on the basis of the position measurement point P2 to the candidate location x1 (second candidate location) extracted on the basis of the position measurement point (previous position measurement point) P1, for each combination of the candidate locations x2a to x2c and the candidate location x1, the movement possibility judgment unit 204 which judges whether or not a moving object can move from one of the candidate locations x2a to x2c to the candidate location x1 for each candidate path on the basis of the movement costs, and the matching location determination unit 206 which determines any one of the candidate locations x2a to x2c included in a candidate path through which the moving object is judged as being capable of moving by the movement possibility judgment unit 204, as a position (matching location) of the moving object on a map.

As mentioned above, even in a case where the position measurement point P2 and the position measurement point P1 are far away from each other, and there are a plurality of candidate paths connecting the position measurement points P1 and P2 to each other, the movement possibility judgment unit 204 judges whether or not a moving object can move through each candidate path on the basis of a movement cost, and can thus determine only a candidate location for which movement is possible as a position (matching location) of the moving object on a map. Therefore, the map matching device 20 can determine a position of a moving object on a map even in a case where an interval of collecting position measurement points.

The movement cost determination unit 202 determines a movement cost for each candidate path on the basis of the movement cost table in which movement costs for one or a plurality of links connecting a certain linkage to other linkages are recorded in advance for each linkage.

As mentioned above, since not only a distance between a candidate location and a linkage but also a movement cost between linkages is recorded in the movement cost table in advance, the movement cost determination unit 202 can reduce a process of determining a movement cost. Even in a case where there are a plurality of candidate paths, the movement cost determination unit 202 can easily determine a movement cost for each candidate path on the basis of the movement cost table.

The map matching device 20 further includes the movable distance estimation unit 203 which acquires speeds of a moving object at the position measurement points P1 and P2, and estimates a movable distance which the moving object can move between the time of measuring the position measurement point P1 and the time of measuring the position measurement point P2 on the basis of the speeds. In a case where a movement cost for a candidate path is less than the movable distance, the movement possibility judgment unit 204 judges that the moving object can move through the candidate path.

As mentioned above, the movement possibility judgment unit 204 estimates a movable distance which the moving object can move between the time of measuring the position measurement point P1 and the time of measuring the position measurement point P2, and thus it is possible to improve the accuracy of judgment of movement possibility in the movement possibility judgment unit 204.

The map matching device 20 further includes the score calculation unit 205 which calculates a score of each candidate location on the basis of a distance between the position measurement point P2 and each of the candidate locations X2a to x2c related to the position measurement point P2. The matching location determination unit 206 determines, as a position of the moving object on the map, any one of candidate locations included in a candidate path through which the moving object is judged as being capable of moving by the movement possibility judgment unit 204, on the basis of a score.

As mentioned above, in a case where there are a plurality of candidate paths through which a moving object is judged as being capable of moving, it is possible to determine a position of the moving object on a map on the basis of scores of candidate locations included in the candidate path.

Second Embodiment

Hereinafter, a description will be made of a map matching system 1 according to a second embodiment with reference to FIGS. 11 to 14.

Constituent elements common to the first embodiment are given the same reference numerals, and detailed descriptions thereof will be omitted.

In the first embodiment, a description has been made of an aspect in which a map matching process is performed on the position measurement point Pi such that a matching location is determined, and then a new map matching process is performed on the next position measurement point Pi+1, but the present embodiment is different from the first embodiment in that a map matching process is performed on a plurality of position measurement points.

(Process Flow in Map Matching System)

Figure 11:
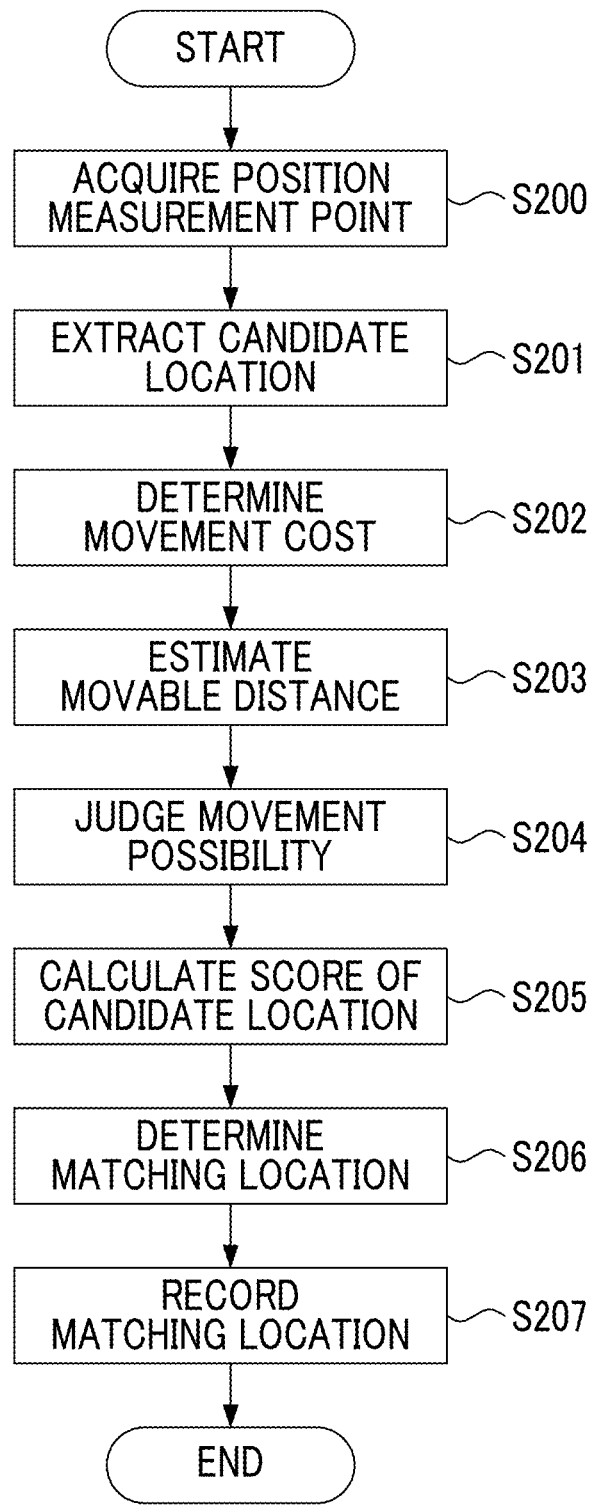
FIG. 11 is a diagram illustrating a process flow in a map matching device according to a second embodiment of the present invention.

FIG. 11 is a diagram illustrating a process flow in a map matching device according to the second embodiment of the present invention.

As illustrated in FIG. 11, first, the candidate location extraction unit 201 acquires a plurality of position measurement points which are map matching process targets from the position measurement point collecting section 10 (step S200).

In the present embodiment, the candidate location extraction unit 201 acquires position measurement points Pi to Pi+n measured in any period among a plurality of position measurement points having a certain apparatus ID, as map matching process targets. In other embodiments, among a plurality of position measurement points having a certain apparatus ID, a predetermined number (n) of position measurement points may be acquired as map matching process targets.

In the following example, a description will be made of a case in which the candidate location extraction unit 201 selects position measurement points P3 to P5 having an apparatus ID "00000001" as the position measurement points Pi to Pi+n which are map matching process targets.

Next, the candidate location extraction unit 201 extracts candidate locations of the position measurement points P3 to P5 (step S201).

A process of the candidate location extraction unit 201 extracting candidate locations of each position measurement point is the same as that in the first embodiment.

Figure 12:
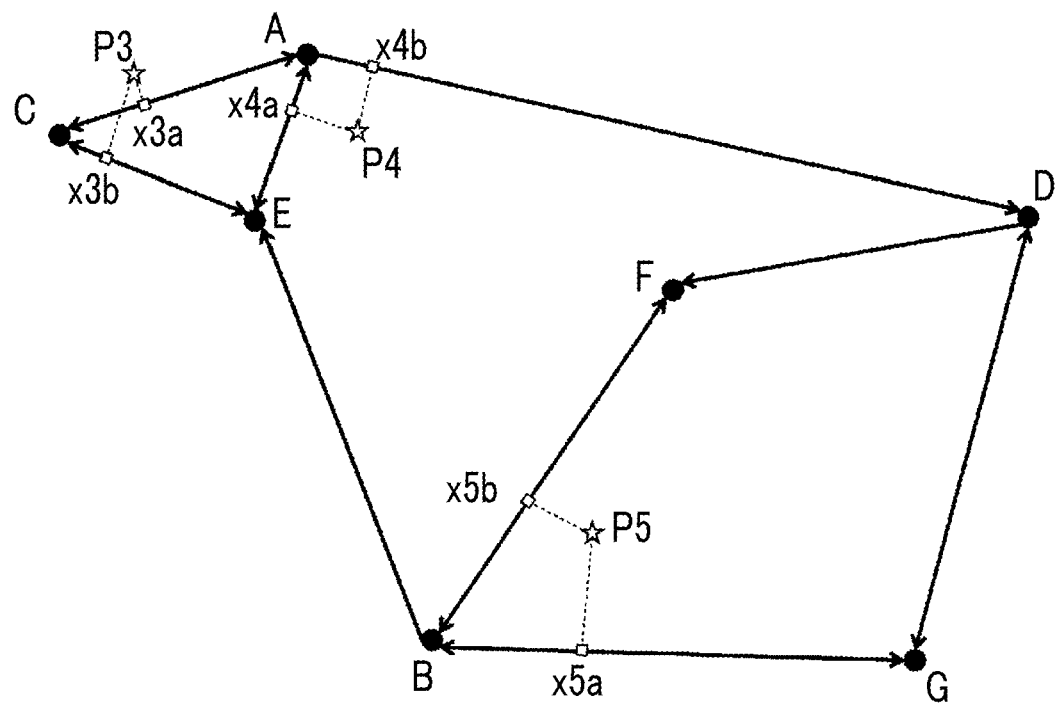
FIG. 12 is a diagram for explaining a function of the map matching device according to the second embodiment of the present invention.

FIG. 12 is a diagram for explaining a function of the map matching device according to the second embodiment of the present invention.

Herein, as illustrated in FIG. 12, it is assumed that the candidate location extraction unit 201 extracts "x3a" and "x3b" as candidate locations of the position measurement point P3, extracts "x4a" and "x4b" as candidate locations of the position measurement point P4, and extracts "x5a" and "x5b" as candidate locations of the position measurement point P5.

Next, the movement cost determination unit 202 determines a movement cost for a link connecting one of candidate locations (first candidate locations) extracted on the basis of the position measurement point Pi to one of candidate locations (second candidate location) extracted on the basis of the previous position measurement point Pi−1 of the position measurement point Pi for each combination (candidate path) of the candidate locations (step S202).

FIG. 13 is a diagram for explaining a process in the movement cost determination unit according to the second embodiment of the present invention.

Specifically, as illustrated in FIG. 13, the movement cost determination unit 202 determines movement costs for candidate paths R21 and R22 connecting the candidate locations x3a and x3b of the position measurement point P3 to the candidate location x2 (not illustrated) of the previous position measurement point P2 on the basis of the movement cost table (FIG. 6). In a case where the previous position measurement point P2 is not included in the plurality of position measurement points acquired in step S200, information of candidate locations related to the position measurement point P2 is read from the matching data recording section 30.

Similarly, the movement cost determination unit 202 determines movement costs for candidate paths R31 to R34 connecting the candidate locations x4a and x4b of the position measurement point P4 to the candidate locations x3a and x3b of the previous position measurement point P3, and candidate paths R41 to R44 connecting the candidate locations x5a to x5b of the position measurement point P5 to the candidate locations x4a and x4b of the previous position measurement point P4 on the basis of the movement cost table.

Next, the movable distance estimation unit 203 estimates a movable distance (maximum movable distance) which a moving object (the moving object mounted with the client A specified by the apparatus ID) can move between the measurement date and time for the position measurement point pi−1 and the measurement date and time for the position measurement point Pi on the basis of a speed of the moving object at the time (the measurement date and time for the position measurement point Pi) of measuring the position measurement point Pi and a speed of the moving object at the time (the measurement date and time for the position measurement point Pi−1) of measuring the previous position measurement point pi−1 (step S203).

Specifically, first, the movable distance estimation unit 203 estimates a movable distance which the moving object can move between the measurement date and time for the position measurement point P3 and the measurement date and time for the previous position measurement point P2. In a case where the previous position measurement point P2 is not included in the plurality of position measurement points acquired in step S200, information regarding the measurement date and time and a speed related to the position measurement point P2 is read from the matching data recording section 30.

The movable distance estimation unit 203 estimates a movable distance which the moving object can move between the measurement date and time for the position measurement point P4 and the measurement date and time for the position measurement point P3, and estimates a movable distance which the moving object can move between the measurement date and time for the position measurement point P5 and the measurement date and time for the position measurement point P4. A process of the movable distance estimation unit 203 estimating a movable distance is the same as that in the first embodiment.

Next, the movement possibility judgment unit 204 judges whether or not the moving object can move through each candidate path on the basis of the movement cost for each candidate path determined by the movement cost determination unit 202 and the movable distance of the moving object estimated by the movable distance estimation unit 203 (step S204).

Specifically, as illustrated in FIG. 13, the movement possibility judgment unit 204 compares the movement cost for each of the candidate paths R21 and R22 with a movable distance (for example, "15 m") of the moving object between the measurement date and time for the position measurement point P2 and the measurement date and time for the position measurement point P3, and judges that the moving object can move through the candidate paths R21 and R22 having a movement cost less than the movable distance.

Similarly, the movement possibility judgment unit 204 compares the movement cost for each of the candidate paths R31 to R34 with a movable distance (for example, "5.5 m") of the moving object between the measurement date and time for the position measurement point P3 and the measurement date and time for the position measurement point P4, and judges that the moving object can move through the candidate paths R31, R32, and R33 having movement costs less than the movable distance, and judges that the moving object cannot move through the candidate path R34 having a movement cost more than the movable distance. Similarly, the movement possibility judgment unit 204 compares the movement cost for each of the candidate paths R41 to R44 with a movable distance (for example, "35 m") of the moving object between the measurement date and time for the position measurement point P4 and the measurement date and time for the position measurement point P5, and judges that the moving object can move through the candidate paths R42 and R44 having movement costs less than the movable distance, and judges that the moving object cannot move through the candidate paths R41 and R43 having movement costs more than the movable distance.

Next, the score calculation unit 205 calculates a score of each candidate location on the basis of distances between the position measurement point Pi and the candidate locations of the position measurement point Pi (step S205).

FIG. 14 is a diagram for explaining a process in the score calculation unit according to the second embodiment of the present invention.

Specifically, as illustrated in FIG. 14, the score calculation unit 205 calculates a score of each of the candidate locations x3a and x3b on the basis of distances between the position measurement point P3 and the candidate locations x3a and x3b of the position measurement point P3. The score calculation unit 205 calculates a score of each of the candidate locations x4a and x4b on the basis of distances between the position measurement point P4 and the candidate locations x4a and x4b of the position measurement point P4. The score calculation unit 205 calculates a score of each of the candidate locations x5a and x5b on the basis of distances between the position measurement point P5 and the candidate locations x5a and x5b of the position measurement point P5. A process of the score calculation unit 205 calculating a score is the same as that in the first embodiment.

Next, the matching location determination unit 206 extracts a combination of candidate paths through which the moving object can move between the position measurement point Pi and the position measurement point Pi+n acquired in step S200 on the basis of a candidate path through which the moving object is judged as being capable of moving by the movement possibility judgment unit 204. In other words, among combinations obtained by selecting and combining candidate locations one by one from each of the position measurement points Pi to Pi+n acquired in step S200, the matching location determination unit 206 extracts a combination of which all candidate locations are included in a candidate path through which the moving object is judged as being capable of moving by the movement possibility judgment unit 204. The matching location determination unit 206 obtains a sum of scores of the candidate locations for each combination (candidate path) of the candidate locations on the basis of the score of each candidate location calculated by the score calculation unit 205. The matching location determination unit 206 determines a candidate location included in a combination of which a sum of scores is smallest, as a matching location for each position measurement point (step S206).

Specifically, the matching location determination unit 206 extracts a combination C1 (R21 (x2 to x3a), R31 (x3a to x4a), and R42 (x4a to x5b)), a combination C2 (R21 (x2 to x3a), R32 (x3a to x4b), and R44 (x4b to x5b)), and a combination C3 (R22 (x2 to x3b), R33 (x3b to x4a), and R42 (x4a to x5b)), as combinations (candidate paths) of candidate locations through which the moving object can move, on the basis of the candidate paths through which the moving object is judged as being capable of moving by the movement possibility judgment unit 204.

The matching location determination unit 206 obtains a sum ("0.8") of scores of the combination C1, a sum ("0.7") of scores of the combination C2, and a sum ("1.1") of scores of the combination C3, on the basis of the score (FIG. 13) of each candidate location calculated by the score calculation unit 205. The matching location determination unit 206 determines the candidate locations x3a, x4b, and x5b included in the combination C2 of which a sum of scores is smallest, as matching locations of the position measurement points P3, P4, and P5, respectively.

Next, the matching location determination unit 206 records the determined matching locations (candidate locations x3a, x4b, and x5b) on the matching data recording section 30 in association with the position measurement points P3, P4, and P5, respectively (step S207).

In a case where the map matching process on the position measurement points Pi to Pi+n (position measurement points P3 to P5) acquired in step S200 is completed, the map matching device 20 returns to step S200, and repeatedly performs the map matching process on the next position measurement point Pi+n+1 and the subsequent position measurement points.

(Advantageous Effects)

As mentioned above, in the map matching device 20 according to the present embodiment, the movement cost determination unit 202 determines, for each candidate path, a movement cost for a candidate path connecting one of candidate locations (first candidate locations) extracted on the basis of a certain position measurement point Pi to one of candidate locations (second candidate locations) extracted on the basis of another position measurement point Pi−1. The matching location determination unit 206 extracts a combination (candidate path) of candidate locations through which a moving object can move between the position measurement point Pi and the position measurement point Pi+n acquired in step S200, on the basis of a candidate path through which the moving object is judged as being capable of moving by the movement possibility judgment unit 204. The matching location determination unit 206 obtains a sum of scores of the candidate locations for each combination (candidate path) of the candidate locations on the basis of the score of each candidate location calculated by the score calculation unit 205. The matching location determination unit 206 determines a candidate location included in a combination of which a sum of scores is smallest, as a matching location for each position measurement point.

For example, as in the first embodiment, in a case where a candidate location having the smallest score is determined as a matching location for each position measurement point, and an error between a position measurement point and a position of the position measurement point on an actual road is large, a wrong candidate location may be determined as a matching location. Since a candidate location of the next position measurement point is determined on the basis of the wrong candidate location, matching locations for the next position measurement point and the subsequent position measurement points may be wrongly determined.

In the present embodiment, however, the matching location determination unit 206 extracts a combination of which a sum of scores is smallest from combinations of candidate locations of the position measurement points Pi to Pi+n through which a moving object can move, and determines a matching location for each of the position measurement points Pi to Pi+n. Thus, even in a case where a position measurement point having a large error is included in the position measurement points Pi to Pi+n, it is possible to comprehensively judge the propriety of a candidate location by referring to a sum of scores of each combination of candidate locations. Therefore, the matching location determination unit 206 can improve the accuracy of determining a matching location for each of the position measurement points Pi to Pi+n.

In the process flow, a description has been made of an aspect of performing the process (step S202) in which the movement cost determination unit 202 determines movement costs for all candidate paths of the position measurement points Pi to Pi+n (the position measurement points P3 to P5) acquired in step S200, but there is no limitation thereto.

In other embodiments, in a case where a movement cost for a candidate path of one position measurement point Pi (position measurement point P3) among the plurality of position measurement points Pi to Pi+n is determined, the movement cost determination unit 202 may proceed to the next steps S203 and S204. In a case where there is another position measurement point Pi+1 for which a movement cost is not determined when the process in step S204 is completed, the flow may return to step S202 again.

In this case, for example, in a case where the movement possibility judgment unit 204 judges that a moving object cannot move through all candidate paths including the candidate location x3b of the position measurement point P3 in step S204, then returns to step S202, and performs a process on the next position measurement point P4, the movement cost determination unit 202 may perform a process of excluding the candidate paths R33 and R34 including the candidate location x3b among the candidate paths R31 to R33 of the position measurement point P4, and determining movement costs therefor.

As mentioned above, the embodiments of the present invention have been described in detail, but the present invention is not limited thereto without being departing from the technical spirit thereof, and some design changes or the like may occur.

For example, in the embodiments, a description has been made of an aspect in which the movement cost table is created for each segment which is divided every predetermined distance (for example, 1 km) from a start point linkage, but there is no limitation thereto. In other embodiments, a predetermined distance may be changed on the basis of an interval of collecting a position measurement point (a time interval at which the client A transmits a position measurement point to the position measurement point collecting section 10) and a speed preset for each moving object (for example, 120 km/h for a vehicle, and 4 km/h for a pedestrian). In this case, for example, a predetermined distance is set to be longer a movable distance which a moving object can move until the next position measurement point is transmitted after a certain position measurement point is transmitted.

In the embodiments, a description has been made of an aspect in which a sum of lengths (distances) of one or a plurality of links connecting a certain linkage to other linkages is indicated by a movement cost for each combination of linkages, but there is no limitation thereto. In other embodiments, a movement cost may be the time required for a moving object to move through one or a plurality of links connecting linkages to each other. A movement cost may be changed according to an attribute of each link. For example, in a case where movement between links accompanies left or right turn, a movement cost may be increased more than a case of advancing straight, and, in a case where a link has an attribute indicating that the link includes a slope, a curve, or the like, a movement cost may be increased. A movement cost for each link may be changed according to an attribute indicating the speed limit of each link. In a case where a movement cost for each link is changed, a predetermined value may be changed according to an attribute (a change of a m, a change of a seconds, or the like), and a predetermined coefficient may be multiplied.

INDUSTRIAL APPLICABILITY

According to the map matching device, the map matching system, the map matching method, and the program, it is possible to determine a position of a moving object on a map even in a case where an interval of collecting position measurement points is long.

REFERENCE SIGNS LIST

1 MAP MATCHING SYSTEM
10 POSITION MEASUREMENT POINT COLLECTING SECTION
20 MAP MATCHING DEVICE
201 CANDIDATE LOCATION EXTRACTION UNIT
202 MOVEMENT COST DETERMINATION UNIT
203 MOVABLE DISTANCE ESTIMATION UNIT
204 MOVEMENT POSSIBILITY JUDGMENT UNIT
205 SCORE CALCULATION UNIT
206 MATCHING LOCATION DETERMINATION UNIT
207 RECORDING MEDIUM
208 OPERATION MANAGEMENT UNIT
30 MATCHING DATA RECORDING SECTION
900 COMPUTER
901 CPU
902 MAIN STORAGE DEVICE
903 AUXILIARY STORAGE DEVICE
904 INPUT/OUTPUT INTERFACE
905 COMMUNICATION INTERFACE
910 AND 920 EXTERNAL STORAGE DEVICE

The invention claimed is:

1. A map matching device which determines a position on a map where a moving object has located on the basis of a position measurement point of the moving object measured while the moving object has traveled, the map is configured with a plurality of links connected to each other, the map matching device comprising
a processor configured to:
select one or a plurality of first links from the plurality of links on the basis of a first position measurement point and one or a plurality of second links from the plurality of links on the basis of a second position measurement point;
extract a first candidate location located on each of the first link on the basis of the first position measurement point and a second candidate location located on each of the second link on the basis of the second position measurement point;
determine a movement cost for links connecting one of the first candidate locations located on the first link and one of the second candidate locations located on the second link, for each combination of the first candidate locations and the second candidate locations;
estimate a movable distance indicating a maximum distance in which the moving object has been able to move from a first time of measuring the first measurement point to a second time of measuring the second measurement point by assuming that the moving object has accelerated from a first speed that is measured when the moving object has located at the first position measurement point to a highest speed after the first time and decelerated from the highest speed to a second speed that is measured when the moving object has located at the second position measurement point until the second time;
compare the movable distance and the moving cost of each combination of the first candidate locations and the second candidate locations and judge that the moving object has been able to move from the first candidate location to the second candidate location of a first combination in case that the moving cost of the first combination is less than the movable distance; and
determine the second candidate location included in any one of the first combination in which the moving object has been able to move, as a position on the map where the moving object has located with respect to the second position measurement point.

2. The map matching device according to claim 1, wherein the processor is further configured to determine a movement cost for each combination of the first candidate locations and the second candidate locations on the basis of a movement cost table in which the movement cost for the link connecting a certain linkage to another linkage is recorded in advance for each combination of the linkages.

3. The map matching device according to claim 1, wherein
the processor is further configured to:
calculate a score of each second candidate location on the basis of a distance between the second position measurement point and the second candidate location related to the second position measurement point, and
determine the second candidate location having the smallest score among the second candidate locations each of which is included in the first combination in which the moving object is able to move, as the position on the map where the moving object has located with respect to the second position measurement point.

4. A map matching system comprising:
a client that measures a position of a moving object as a position measurement point;
a position measurement point collecting section that collects the position measurement point measured by the client; and
the map matching device according to claim 1.

5. A map matching method of determining a position on a map where a moving object has located on the basis of a position measurement point of the moving object measured while the moving object has traveled, the map is configured with a plurality of links connected to each other, the map matching method comprising steps of:

selecting one or a plurality of first links from the plurality of links on the basis of a first position measurement point and one or a plurality of second links from the plurality of links on the basis of a second position measurement point;

extracting a first candidate location located on each of the first link on the basis of the first position measurement point and a second candidate location located on each of the second link on the basis of the second position measurement point;

determining a movement cost for links connecting one of the first candidate locations located on the first link and one of the second candidate locations located on the second link, for each combination of the first candidate locations and the second candidate locations;

estimating a movable distance indicating a maximum distance in which the moving object has been able to move from a first time of measuring the first measurement point to a second time of measuring the second measurement point by assuming that the moving object has accelerated from a first speed that is measured when the moving object has located at the first position measurement point to a highest speed after the first time and has decelerated from the highest speed to a second speed that is measured when the moving object has located at the second position measurement point until the second time;

comparing the movable distance and the moving cost of each combination of the first candidate locations and the second candidate locations and judging that the moving object has been able to move from the first candidate location to the second candidate location of a first combination in case that the moving cost of the first combination is less than the movable distance; and determining the second candidate location included in any one of the first combination in which the moving object is able to move, as a position on the map where the moving object has located with respect to the second position measurement point.

6. A non-transitory computer readable medium which records a program causing a computer of a map matching device which determines a position on a map where a moving object has located on the basis of a position measurement point of the moving object measured while the moving object has traveled, the map is configured with a plurality of links connected to each other, to perform steps of:

selecting one or a plurality of first links from the plurality of links on the basis of a first position measurement point and one or a plurality of second links from the plurality of links on the basis of a second position measurement point;

extracting a first candidate location located on each of the first link on the basis of the first position measurement point and a second candidate location located on each of the second link on the basis of the second position measurement point;

determining a movement cost for links connecting one of the first candidate locations located on each of the first link and one of the second candidate locations located on the second link, for each combination of the first candidate locations and the second candidate locations;

estimating a movable distance indicating a maximum distance in which the moving object has been able to move from a first time of measuring the first measurement point to a second time of measuring the second measurement point by assuming that the moving object has accelerated from a first speed that is measured when the moving object has located at the first position measurement point to a highest speed after the first time and has decelerated from the highest speed to a second speed that is measured when the moving object has located at the second position measurement point until the second time;

comparing the movable distance and the moving cost of each combination of the first candidate locations and the second candidate locations and judging that the moving object has been able to move from the first candidate location to the second candidate location of a first combination in case that the moving cost of the first combination is less than the movable distance; and determining the second candidate location included in any one of the first combination in which the moving object has been able to move, as a position on the map where the moving object has located with respect to the second position measurement point.

7. The map matching device according to claim 2, wherein the processor is further configured to:

calculate a score of each second candidate location on the basis of a distance between the second position measurement point and the second candidate location related to the second position measurement point, and determine the second candidate location having the smallest score among the second candidate locations each of which is included in the first combination in which the moving object is able to move, as the position on the map where the moving object has located on the basis of the score with respect to the second position measurement point.

8. The map matching device according to claim 3, wherein the processor is further configured to:

calculate a score of each first candidate location on the basis of a distance between the first position measurement point and the first candidate location related to the first position measurement point, and determine the first candidate location having the smallest score among the first candidate locations each of which is included in the first combination in which the moving object has been able to move, as the position on the map where the moving object has located with respect to the first position measurement point.

\* \* \* \* \*